United States Patent [19]

Vork

[11] 4,086,936

[45] May 2, 1978

[54] VARIABLE SEAT CHECK VALVE

[75] Inventor: William Duncan Vork, Edina, Minn.

[73] Assignee: Graco Inc., Minneapolis, Minn.

[21] Appl. No.: 714,293

[22] Filed: Aug. 16, 1976

[51] Int. Cl.$^2$ ............................................. F16K 15/04
[52] U.S. Cl. .......................... 137/533.11; 137/516.29; 251/332
[58] Field of Search ................. 137/DIG. 2, 516.29, 137/519.5, 533.11, 533.13, 533.15, 539, 539.5; 251/332, 364

[56] References Cited

U.S. PATENT DOCUMENTS

| 639,403 | 12/1899 | Klopp | 137/DIG. 2 |
|---|---|---|---|
| 1,764,186 | 6/1930 | Teesdale | 137/533.15 X |
| 2,223,509 | 12/1940 | Brauer | 251/332 X |
| 2,371,293 | 3/1945 | Hoof | 137/539 X |
| 3,126,028 | 3/1964 | Kurfiss | 251/332 X |
| 3,134,572 | 5/1964 | Glasgow | 137/516.29 X |
| 3,323,560 | 6/1967 | Ehlers | 137/533.13 X |
| 3,324,880 | 6/1967 | Roberts | 137/516.29 |
| 3,327,991 | 6/1967 | Wallace | 251/332 X |

*Primary Examiner*—Robert G. Nilson
*Attorney, Agent, or Firm*—Paul L. Sjoquist

[57] ABSTRACT

Apparatus for use in a reciprocating pump wherein a one-way check valve opens to admit fluid from a reservoir during the pump upstroke and a second one-way check valve opens to expel fluid from the pump during the downstroke. The apparatus includes a valve seat having a frusto-conical shape and formed from resilient material, and a spherical metallic ball, together with a rigid seat edge liner for restricting the seat resilient expansion. In operation, the invention enables the check valve in the check position to automatically compensate for excessive forces against the ball by distributing these forces over a variable spherical ball/seat surface to provide a predetermined maximum pressure on the valve seat.

5 Claims, 4 Drawing Figures

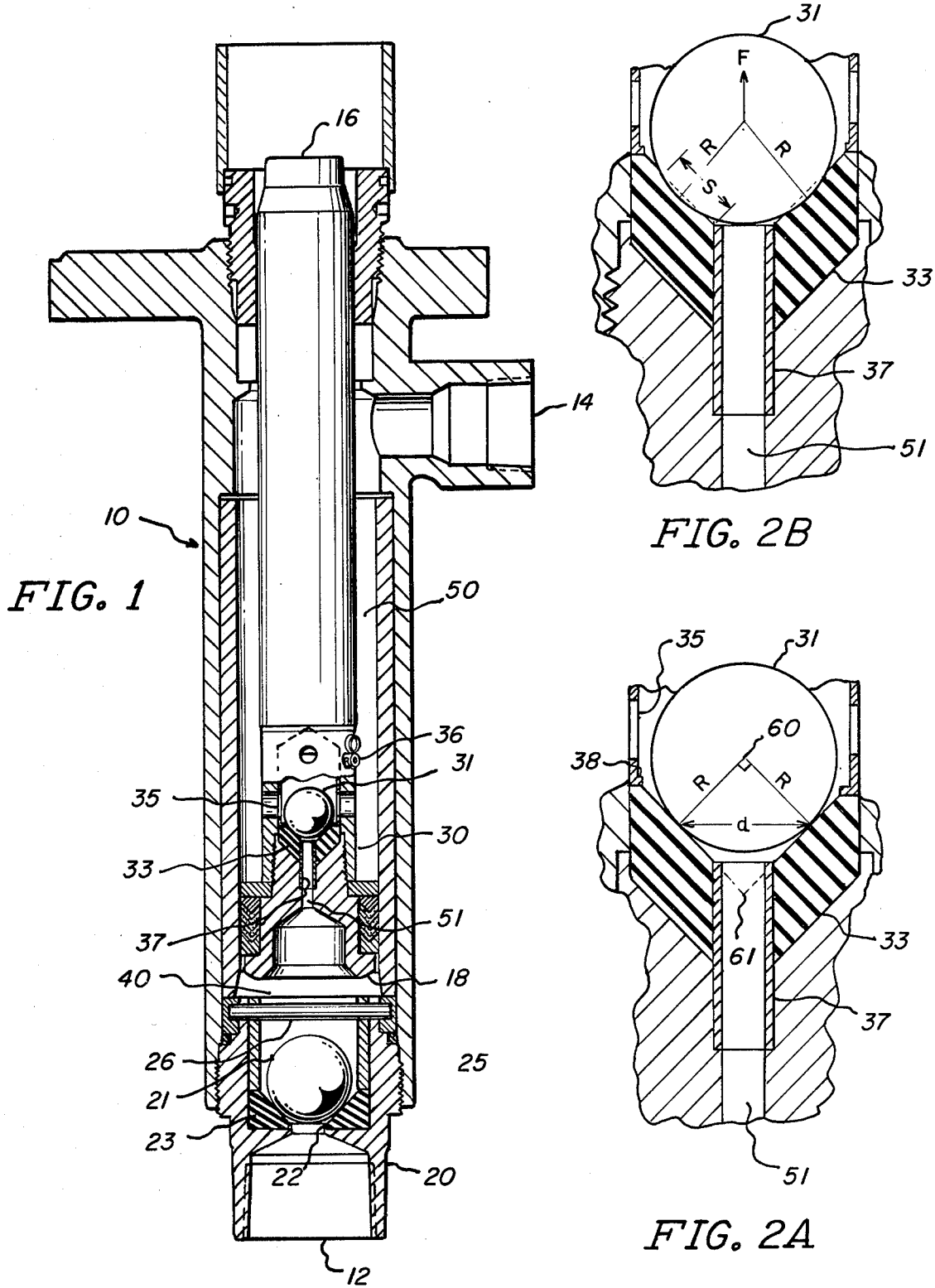

VARIABLE SEAT CHECK VALVE

BACKGROUND OF THE INVENTION

This invention relates to a novel check valve construction, and specifically to a check valve for use in a reciprocating fluid pump. The invention is especially adaptable for use in pumping certain types of fluids, particularly those fluids which tend to break down under heavy and severe pressure gradients. An example of a type of fluid for which this undesirable characteristic is present is metallic paints, such as zinc-based or lead-based paints wherein the metallic paint component tends to form a weldment when stressed between a valve and seat under severe pressure.

Paints and other coating materials are typically applied using a spray gun system wherein the coating material is placed under a fluid pressure of up to 2,000 pounds per square inch (psi) in order to achieve proper atomization of the coating material for spraying. The device that develops this high fluid spraying pressure is typically a reciprocating pump which is mechanically connected to an air-operated drive motor. The air drive motor usually has an enlarged piston as compared with the pump piston so that pressure multiplication may be achieved in the system. For example, a 30:1 ratio pumping system has an air drive motor which accepts compressed air in the 0-100 psi pressure range, and the pump delivers pressurized coating material at a fluid pressure of 30 times the air pressure driving the motor. Coating material under this elevated pressure is delivered from the pump through suitable hoses to spray guns which are used to apply the material, and all elements of the delivery system must be designed to withstand the fluid pressures used. In particular, the interior components of the pump must be designed for a smooth and continuous operation at these elevated pressures, including the pump fluid valving elements which open and close during each stroke of the pump cycle. A typical system which is designed to operate under these conditions is a Model 205-457 pumping system, manufactured by the assignee of the present invention.

The reciprocating pump within which the present invention is adaptable for use has an internal mechanically reciprocated piston, and two internal valves. A foot valve is located generally below the piston, comprising a ball riding on a seat wherein upward piston movement creates a suction force which lifts the ball from the seat to admit coating material into an intake chamber, and downward piston movement forces the ball against the seat to prevent coating material from being expelled through the inlet. A piston valve comprises a ball and seat combination wherein upward piston movement forces the ball against seat to prevent fluid trapped above the piston, in a pumping chamber, from passing downward into the intake chamber, and during the downward piston movement the ball is lifted from its seat to admit coating material from the intake chamber into the pumping chamber above the piston. In this type of pump the pump outlet is generally placed above the piston in fluid coupling connection to the pumping chamber so that fluid may be expelled during both piston stokes. Both the foot valve and the piston valve are subjected to the same high coating material pressures which are present throughout the spraying system, and these components must be capable of continuous useful operation during the life of the pump.

When coating materials having a high solids content are pumped with this type of system, the solids in the coating material present a particular problem in maintaining a smooth and continuous operation of the pump foot valve and piston valve. For example, coating materials having a 25-70% content of powdered zinc tend to clog these valves and cause sticking so that the respective balls do not reliably lift from the valve seats. This is thought to be caused by the extremely high force gradients which are imposed upon the zinc particles in the region of the ball/seat contact area. Prior art valves have used virtually a line contact region between the ball and its seat, and zinc particles which are trapped in the contact area when the valve is closed are placed under extremely high forces, which have been noted to be sufficiently high to cause a weldment between the particles and the ball and seat. When a weldment occurs, the ball and seat become fused together to disable the pump. Other prior art devices have used a valve seat which is molded to the shape of the ball so as to provide a larger surface over which physical forces may be distributed and thereby to reduce the overall force on particles trapped between the ball and seat. An example of this prior art may be found in U.S. Pat. No. 3,395,890, wherein a molded plastic seat is formed to match the shape of the ball during the valve manufacture process. Still other prior art solutions to the problem have involved using a spherical valve seat in combination with a resilient ball member. An example of this prior art may be found in U.S. Pat. No. 3,787,149, issued Jan. 22, 1974, wherein the ball/seat contact area is spherical to distribute the forces over a wider area, and the ball is made from a resilient material so as to more readily release itself from the seat.

A disadvantage which is found in prior art devices utilizing a ball and seat spherical complementary shape is that under high fluid pressures the ball may have a tendency to become trapped in the seat because of the wide area of contact between these two components. Although the pressure forces on individual solid particles becomes reduced, a greater number of particles may become trapped in the common mating area to cause a sticking force which prevents the ready separation of the ball from the seat.

SUMMARY OF THE INVENTION

The present invention overcomes the disadvantages of the prior art by including a resilient seat member having a non-complementary shape to the spherical ball, and further having a deformable conical shape to provide variable pressure equalization. The invention utilizes a metallic ball sized in relation to the conical seat surface for providing limited deformation of the seat under pressure, and reforming the seat back to a line contact with the ball under no-load conditions, thereby releasing and expelling the ball from continuous contact with the seat. Support means is provided around the inner and outer seat diameter so as to limit the maximum deformation which can occur in the seat.

BRIEF DESCRIPTION OF THE DRAWINGS

A preferred embodiment of the present invention is described herein, and in conjunction with the appended drawings, in which:

FIG. 1 shows the invention in side view cross section;

FIG. 2A shows the invention under unpressurized conditions;

FIG. 2B shows the invention under pressurized conditions; and

DETAILED DESCRIPTION

Figure 3:
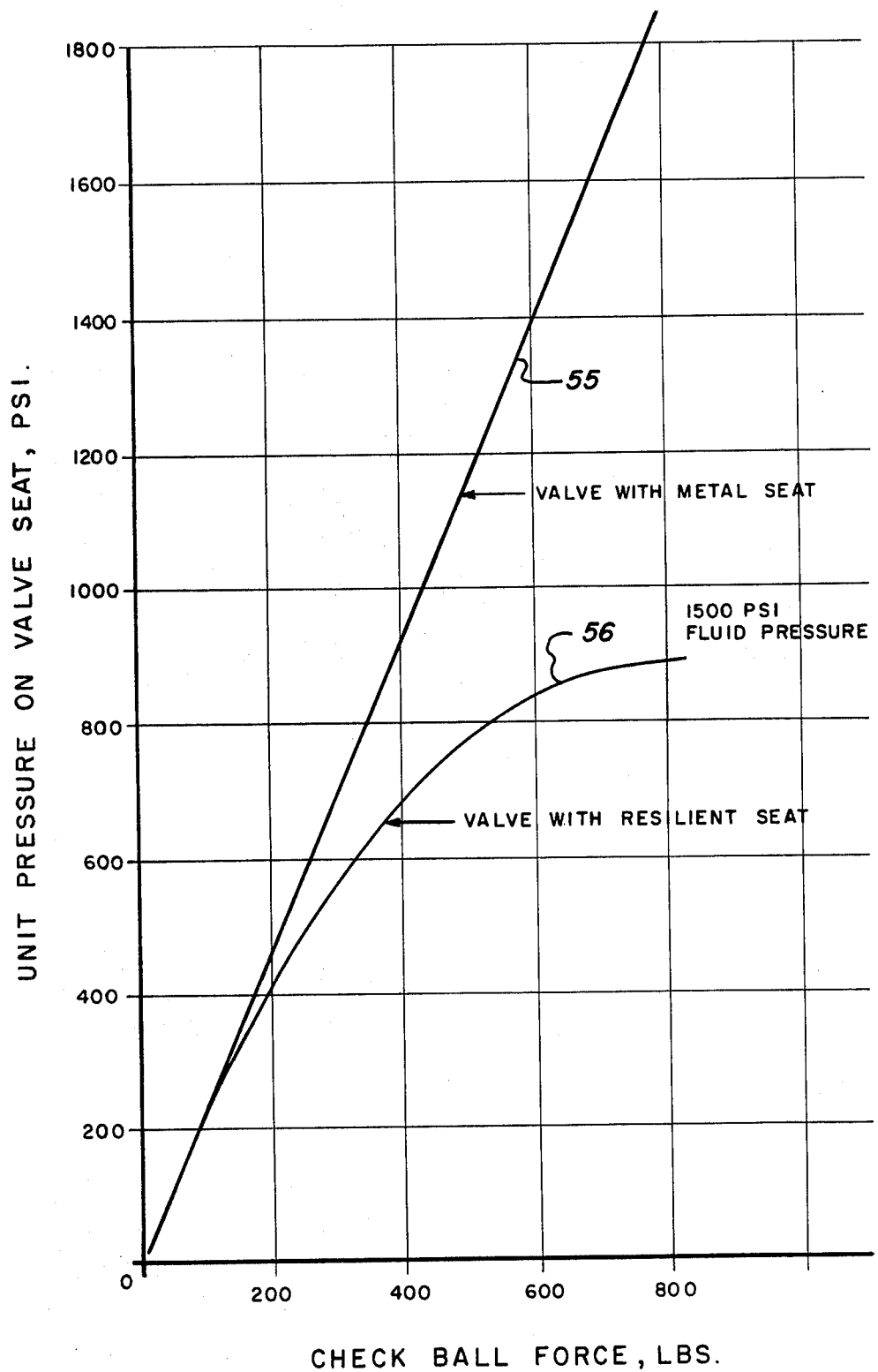
FIG. 3 shows a chart illustrating the advantageous pressure relations of the invention.

Referring first to FIG. 1, a fluid pump 10 is shown in partial cross section, illustrating the present invention. Pump 10 has an inlet 12, preferably for immersion into a supply of coating material to be pumped. An outlet 14, from which the pump material is expelled, is adapted for suitable connection to paint spray guns or other applicator devices. Pump 10 has a rod 16 which is mechanically coupled to a reciprocating driving device, such as has been hereinbefore described. A piston 18 is attached to rod 16 for creating the necessary fluid pumping pressures. A foot valve assembly 20 is threaded into the base of pump 10, and includes a ball check 21 and a seat 23. A ball guide 25 is concentrically fitted into foot valve assembly 20, and is held in position by means of a pin 26 which projects through holes in ball guide 25 and foot valve assembly 20. The bottom edge of ball guide 25 rests snugly against top surface of seat 23. Seat 23 is made from a resilient material such as urethane, and is shaped as will hereinafter be described in more detail with reference to FIGS. 2A and 2B. An internal collar 22 is formed on foot valve assembly 20 to reinforce the interior diameter of seat 23.

Piston valve assembly 30 includes a ball check 31 and seat 33. A ball guide 35 is concentrically fitted within piston valve assembly 30, and is held in position by means of pin 36 which protrudes through holes in ball guide 35 and the piston valve assembly 30. Ball check 31 and seat 33 are functionally similar to ball check 21 and seat 23, although shaped somewhat differently and scaled down in size. A metal sleeve 37 abuts against and supports the inner diameter of seat 33.

Pump 10 has an intake chamber 40 which is fluid coupled via check valve 20 to inlet 12. When piston 18 is reciprocated upwardly fluid is drawn into intake chamber 40 by means of suction, which raises ball check 21 to admit the fluid. When piston 18 reciprocates downwardly fluid is forced into pumping chamber 50 via passage 51 and piston valve 30. The downward movement of piston 18 against the fluid in intake chamber 40 forces ball check 31 from its seat to admit the fluid into pumping chamber 50. The upward movement of piston 18 forces the fluid in pumping chamber 50 to be expelled through outlet 14, and during this upward movement, ball check 31 is held against its seat.

FIG. 2A shows an expanded view of piston valve assembly 30 is an unpressurized condition. Ball check 31 has a radius R, and it rests upon seat 33 in a position such that two radial lines R which are drawn from the ball/seat contact points will intersect at the center of ball check 31 in a 90° angle 60. The top surface of seat 33 has frusto-conical shape, whose apex 61 is centered directly beneath the center of ball check 31. Thus, under unpressurized conditions, ball check 31 rests on seat 33 and the ball/seat contact area comprises a line contact having a diameter d which is determined by the equation:

$$d = 2R \cos 45° = 1.414R$$

Ball guide 35 has a circumferential edge 38 which rests upon the top of seat 33. Sleeve 37 is inserted into passage 51 to provide interior support around the internal diameter of seat 33. Therefore, seat 33 is supported and constrained from resilient expansion on all of its surfaces except the surface contacting ball check 31. This supporting structure for seat 33 provides that downward forces against ball check 31 will be absorbed by seat 33 as energy in deforming the material from which seat 33 is made, and will not force the material to occupy a volume outside of the prescribed volume in which the seat originally existed. This feature enables a fairly simple calculation of the required deformation and resiliency of seat 33, for only the physical characteristics of the material itself need be considered.

FIG. 2B illustrates piston valve assembly 30 under pressurized conditions. Under these conditions ball check 31 is pressed into seat 33 to cause a seat deformity along the seat surface adjacent the ball. The area of contact between ball check 31 and seat 33 is determined by the equation:

$$A = \pi d s$$

The term "s" in the foregoing equation represents the spherical surface arc along ball check 31 which contacts seat 33. The maximum value this spherical surface arc $s$ can achieve is very nearly equal to the cone surface length of seat 33, and this surface length may be chosen in combination with appropriate resilient materials for seat 33 to accommodate any reasonable operating fluid pressures. Under maximum pressure conditions, ball check 31 deforms seat 33 to the point where ball check 31 contacts the upper edge of sleeve 37. Proper selection of the resilient material of seat 33, for example urethane material, will enable the ball to deform seat 33 to a distance less than the contact distance to the top edge of sleeve 37. A typical urethane material will have a compressive strength of 20,000 pounds per square inch (p.s.i.) and a compressive modulus of $0.04 - 0.90 \times 10^5$ p.s.i. Therefore for a typical 1-inch diameter ball check and a urethane seat having a cone surface length of about $\frac{1}{8}$ inch, a force of over 20,000 pounds can be safely exerted upon the ball under maximum pressure conditions.

It should be noted from FIG. 2B that the resilient material of seat 33 exerts a resilient force upward against ball 31 along the radial paths R which intersects seat 33 as show in FIG. 2A. These upward resilient forces are additive, and having net vertical force component F which greatly assists in propelling ball check 31 from seat 33 whenever the internal pressures are relieved. The upward force component F therefore acts to forcibly release ball check 31 from its seat whenever the piston stroke is reversed. The forcible release of the ball from its seat, which is caused by the compressive energy stored within the elastic seat material, greatly improves the valve-opening performance and prevents valve sticking.

In operation, the downward movement of the pump piston causes the piston valve ball check to lift from its seat and simultaneously forces the foot valve ball check into a compressive relationship against its seat. The pressurized pumped material is expelled from the pump outlet. At the bottom of the piston stroke the foot valve ball check is pressed into its seat and compressive energy is stored within the elastic seat material. As the pump piston begins its upward stroke fluid force against the foot valve ball check is relieved and the compressive energy stored in the foot valve seat acts to force the ball upwardly away from the seat, thereby insuring immediate and positive valve-opening action. A similar effect occurs during the piston up-stroke with respect to the piston valve ball check, and this causes an immediate and positive valve-opening action for the piston valve after the piston passes its uppermost position and begins its downstroke.

FIG. 3 shows a graph illustrating the advantageous operation which is achieved with the present invention. Curve 55 shows pressure on a valve seat in psi for various ball forces, which can be expected when a typical valve having a metal valve seat is used. As the force against the ball increases the pressure on the valve seat correspondingly increases. Depending upon the type of fluid being pumped, and assuming the fluid contains a metallic component in its mixture, a unit pressure is ultimately reached whereby the pressure on the metallic particles trapped between the ball and seat is sufficient to cause fusion of the particles to either the ball or the seat. To avoid this problem, it becomes necessary to select an operating fluid pressure which is low enough to keep safely out of the fusion range. This results in a poor quality spray coating and is therefore an unsatisfactory compromise.

Curve 56 illustrates the unit pressure relationship to ball force using the present invention. As the ball force increases the unit pressure on the valve seat increases at an ever-flowing rate, thus enabling the system to operate at relatively higher fluid pressures without encountering the fusion problem. For example, FIG. 3 shows the operation of the two corresponding valve concepts at a fluid pressure of 1500 psi. The check ball force in pounds is then a function of the diameter of the ball selected for a particular application. If for example, a ball diameter is selected which produces 600 pounds of force against the ball, curve 55 shows that the unit pressure on the metallic valve seat is 1400 psi. Particles trapped between the ball and seat are therefore subjected to a 1400 psi compression pressure, which for some particles may be high enough to cause the particles to become fused either the ball or the seat. By contrast, curve 56 shows that a 600 pound ball force will yield only slightly over 800 psi unit pressure on the valve seat, which is significantly lower than is the case with a metal seat.

Further, FIG. 3 shows that if the ball diameter were reduced to give a resultant check ball force of about 800 pounds for the present invention (curve 56), for a unit pressure of about 900 psi, the corresponding unit pressure using a metal seat arrangement would be in excess of 1800 psi. The net result is that the present invention is safer for spraying a wider range of coating materials over a given fluid pressure range.

In operation the present invention provides an automatic and self compensating ball/seat contact area for whatever ball forces are present under given fluid pressure conditions. As the pump piston compresses the ball against the seat the ball deforms the seat to increase the relative contact area and thereby distributes the valve seat unit pressure over a wider area. When the pump piston moves away in the direction of decompression, the energy which caused the seat to deform is stored within the resilient material of the seat and becomes immediately available in the form of a resilient upward force against the ball to spring it free from the seat. This last effect creates a supplementary valve-opening force and thus permits the valve to immediately spring open during the piston return stroke to admit fluid into the chamber. Thus, not only does the invention provide a means for equalizing pressure during a pump compression stroke, but it also provides a quick opening means for unseating the ball during the return stroke.

The present invention may be embodied in other specific forms without departing from the essential attributes thereof, and it is therefore desired that the present embodiment be considered in all respects as illustrative and not restrictive, reference being made to the appended claims rather than to the foregoing description to indicate the scope of the invention.

What is claimed is:

1. In a valve apparatus having a ball and seat combination surrounded by a valve housing except for a fluid flow passage through said seat and which may be obstructed by said ball, the improvement comprising a resilient seat member having its outside surfaces supported against said valve housing, and having a first inside surface defining said fluid flow passage, and having a second inside surface facing said ball with a frustoconical shape converging toward said first inside surface; a spherical ball having a size such that the diameter of unloaded line contact of said ball against said second inside surface is proximate to the midpoint of said frustoconical shape; and a rigid supporting sleeve in said fluid flow passage adjacent said first inside surface.

2. The apparatus of claim 1 wherein said ball is metallic and said seat member is made from urethane plastic material.

3. A ball check valve of the type allowing one-way fluid flow by the ball lifting from a seat in the fluid flow direction and closing against the seat in the reverse direction, comprising:
   (a) a seat having a central passage therethrough, said seat being constructed from elastomeric material and having a frustoconical surface facing the ball;
   (b) a non-elastomeric ball having a diameter such that the unloaded contact point of said ball against said frustoconical seat surface is approximately midway along said seat surface;
   (c) a rigid sleeve in said seat central passage, said sleeve being in confining and supporting contact with said elastomeric material; and
   (d) means for confining said elastomeric seat material on all of its surfaces except said frustoconical surface facing said ball.

4. The apparatus of claim 3 wherein said seat is constructed from urethane.

5. The apparatus of claim 4 wherein said ball and said sleeve are constructed from metal, and said sleeve terminates at the edge of said seat frustroconical surface.

* * * * *